United States Patent [19]

Whewell

[11] Patent Number: 5,269,953
[45] Date of Patent: Dec. 14, 1993

[54] SYNTHETIC CARBON ALLOTROPES: GRAPHITE INTERCALATED WITH BUCKMINSTERFULLERENES

[76] Inventor: Christopher J. Whewell, 37250 Chagrin Blvd., Moreland Hills, Ohio 44022

[21] Appl. No.: 996,906

[22] Filed: Dec. 28, 1992

Related U.S. Application Data

[63] Continuation-in-part of Ser. No. 778,518, Oct. 18, 1991, abandoned, which is a continuation-in-part of Ser. No. 726,979, Jul. 8, 1991, abandoned.

[51] Int. Cl.$^5$ .................. C01B 31/00; C01B 31/04
[52] U.S. Cl. .................. 252/30; 252/29; 423/445; 423/448; 423/460; 505/1
[58] Field of Search ............. 423/445, 448, 449, 460, 423/445 B; 252/29, 30; 505/1

[56] References Cited

U.S. PATENT DOCUMENTS

| | | | |
|---|---|---|---|
| 496,742 | 5/1893 | Lever | 252/29 |
| 3,361,666 | 1/1968 | Webbi et al. | 252/29 |

FOREIGN PATENT DOCUMENTS 305790 3/1989 European Pat. Off. ........... 427/249

OTHER PUBLICATIONS

Guo et al., *Journ. Phys. Chem.*, vol. 95, Jun. 27, 1991, pp. 4948–4950.
Kroto et al., "$C_{60}$:Buckminsterfullerene" *Nature* vol. 318, Nov. 14, 1985, pp. 162–163.
Haufler et al. "Efficient Production of $C_{60}$, $C_{60}H_{36}$ and the Soluated Buckide Ion" *J. Phys. Chem.*, vol. 94, Nov. 29, 1990, pp. 8634–8636.
Cox et al. "Characterization of $C_{60}$ +$C_{70}$ Clusters", *Journal Am. Chem. Soc.*, vol. 113, Apr. 10, 1991, pp. 2940–2944.
Chai et al. *Journ. Phys. Chem.*, vol. 95, Oct. 3, 1991, pp. 7564–7568.

*Primary Examiner*—Michael Lewis
*Assistant Examiner*—Stephen G. Kalinchak

[57] ABSTRACT

Carbon-containing compositions comprising graphite sheets which contain various buckminsterfullerene species hosted in their interstices are provided, as well as methods for preparation of said compositions.

20 Claims, No Drawings

SYNTHETIC CARBON ALLOTROPES: GRAPHITE INTERCALATED WITH BUCKMINSTERFULLERENES

CROSS REFERENCE TO RELATED APPLICATIONS

This application is a continuation-in-part of U.S. Ser. No. 07/778,518 filed Oct. 18, 1991, now abandoned, which itself was a continuation-in-part of U.S. Ser. No. 07/726,979, filed Jul. 8, 1991, now abandoned.

BACKGROUND OF THE INVENTION (1) Field of the invention

This invention relates to novel compositions of matter and particularly to compositions which comprise a graphite framework which is intercalated by one or more buckminsterfullerene species and optionally by other additional chemical species. Methods for preparation of the compositions are disclosed.

(2) Description of the prior art

Elemental carbon occurs throughout the universe in different allotropic forms. Two of the allotropes which are frequently encountered are graphite and diamond. In their purest forms, these materials are composed entirely of carbon atoms, and the differences in their physical and chemical properties arise from differences in the arrangement and bonding between the carbon atoms they comprise. For example, diamond is known to exist with a cubic structure built up from sp3-hybridized tetrahedrally arranged carbon atoms. The lattice layers follow the sequence, ABCABC.

The structure of graphite has been known for quite some time. See "The Nature of the Chemical Bond" by Linus Pauling, third edition, pages 234-235. Graphite is a layered structure containing stacked layers or "sheets" of sp2-hybridized carbon atoms. The carbon atoms within a given layer are configured in a planar hexagonal array with each individual carbon atom being strongly bonded to its three neighboring carbon atoms. Adjacent layers are held together by chemical forces which are much weaker than those which bond the carbon atoms within a given layer to one another. Accordingly, the distance between carbon atoms within a given layer is much less than the distance between the adjacent layers. The distance between adjacent layers is about 3.35 Angstrom units, while the distance between individual carbon atoms within a given layer is about 1.4 Angstrom units. It is generally accepted that the sliding motion of the sheets over one another gives rise to the observed lubricity of graphite.

Amorphous carbons which include soots, carbon black, charcoals, lampblack and the like are all microcrystalline forms of graphite. The macroscopic properties of these materials depend upon their particle size and surface area. Amorphous carbons are frequently employed as support materials for noble metal and other catalysts. Other forms of graphite include fibers, foams, foils, and whiskers.

Another family of allotropes of elemental carbon known as "buckminsterfullerenes" exist wherein the individual carbon atoms are bonded to one another so as to take on the shape of truncated icosahedra. Such materials are conveniently pictured as graphite sheets which have been wrapped around themselves or manipulated so as to form a closed sphere. The 3-dimensional structure formed by the carbon atoms of such materials resembles a spherical cage or shell. Generally, the molecules of the buckminsterfullerenes are reminiscent of a soccerball, since they are roughly spheroidal and comprise both pentagonal and hexagonal rings of carbon atoms as units from which they are built up. Allotropic homonuclear buckminsterfullerene-type spheroids comprising 60, 70, 84, and higher analogous species containing larger numbers of carbon atoms in the form of a cage structure are known. The simplest such structure, containing 60 carbon atoms, has been described in the publication entitled, "Nature" in volume 318, page 162. Other buckminsterfullerenes are described in the following publications and are incorporated herein by reference: "Chemical and Engineering News", Oct. 29, 1990 issue, pages 22-25; "Journal of Physical Chemistry" Vol. 94, pages 8634-8636 (1990); Nature, Volume 350, Mar. 7, 1991; and "Scientific American", Oct. 1991 issue.

Pure carbon in its various known allotropic forms provides many currently-useful and many potentially useful commercial and research applications. For example, the high thermal conductivity of diamond along with its electrically insulative properties allows its widespread use as a heat sink material for certain solid state devices in the microelectronics industry. Graphite has been used successfully as a lubricant and a catalyst support material. Various carbons have also found use as electrically resistive compositions commonly found in many types of electrical components. Additionally, it has been observed that the 60-carbon atom buckminsterfullerene becomes a superconductor at 18 degrees K when doped with potassium. (See "Science" 252, 1154 (1991).

SUMMARY OF THE INVENTION

The present invention provides new and useful synthetic compositions comprising carbon and methods for their preparation. Due to their unique chemical structure, the compositions disclosed are useful as catalyst supports, lubricants, electrical circuit elements such as resistances, semi-conductors, or reinforcement materials.

Graphite undergoes reactions in which it becomes intercalated by various chemical elements or a wide range of chemical compounds by reaction of the graphite and a selected element or compound at ambient or an eleveted temperature. Among the former are the larger alkalai metals, and the halogens, one example being bromine. Transition metal compounds or salts and acids are common compounds which may be successfully intercalated in the interstices of graphite, as well as various gaseous species. Chemical species comprising at least one halogen atom and at least one metal atom such as chlorides or bromides of Ni, Fe, La, Sb, Al, As, Co, and many other elements fom intercalation compounds with graphite.

Halogen compounds form intercalation compounds with graphite. Acids or their anions such as nitrate, phosphate, arsenate, chlorate, sulfate, hydrogen-sulfate, mono- and di-hydrogen phosphates, and others are known to undergo intercalation into the interstices of graphite. Several more examples are illustrated in "Advanced Inorganic Chemistry" by Cotton and Wilkinson, 5th ed., 1988, and "Advanced Inorganic Chemistry" by Durrant and Durrant, 2nd ed. (1970) both published by John Wiley and Sons, New York, N.Y., and are incorporated herein by reference. These include many metal atoms, metal salts (such as, for example, ferric chloride, nickel halide salts, transition metal hexafluorides or their anions such as, for example ReF, bromine, 6 iodine monochloride, molecules and ions of oxidizing and non-oxidising acids and water molecules.

Electrochemical means may also be employed to cause intercalation of chemical species into graphite. For example, hydrogen fluoride which contains NaF as an electrolyte and using graphite as a counter electrode results in intercalation of mixed fluoride species into graphite (N. Bartlett in Journal of the Chemical Society, Chemical Communications, 1983, pages 103-105). It is likely that nearly every element of the periodic table of the elements, in one form or another in suitable combination with other elements (as, for example, in the cases of complex ions or giant molecules) will form intercalation compounds of graphite.

When graphite is reacted with a material with which it forms lamellar compounds, the distance between the layers of the hexagonal carbon atom networks of the graphite generally increases. Near one extreme there exists a material known as "graphitic oxide" which is produced by oxidizing graphite with strong oxidizing acids such as HNO3 and HClO4 (see U.S. Pat. Nos. 2,933,381, and 2,944,881) wherein chemical species which contain oxygen and hydrogen atoms are caused to become intercalated in the graphite layers. In this material it has been possible to increase the interlayer distance of graphite sheets to as much as 14 angstrom units.

The preparation of compositions of the present invention are effected by reacting graphite with a first chemical species in order to produce a lamellar compound of graphite (LCOG) which has some of the first chemical species hosted inbetween the sheets of the graphite. The LCOG intermediate produced is then reacted with a buckminsterfullerene species at an elevated temperature so as to cause insertion of the buckminsterfullerene species between the graphite sheets. As an optional final step, the product of the intercalation reaction may be treated with a suitable reagent for effective removal of the first chemical species, thereby leaving only the buckminsterfullerene species inbetween the graphite layers.

Since various buckminsterfullerenes or combinations thereof may be the intercalating species, a whole new class of carbon allotrope results. To this general class of synthetic carbon allotrope I now give the name "Lubrizites".

All chemical species which are intercalable into graphite interstices and cause the interlayer separation of the graphite sheets to increase sufficiently for subsequent insertion of a given buckminsterfullerene species into said interstices are hereby indicated as having utility for purposes of the process of the instant invention, and are accordingly indicated as part of this invention. In general, the graphite layers must be widened greater than about 7 angstroms.

According to this invention, buckminsterfullerene species are caused to occupy the interstices of graphite layers. Since the buckminsterfullerene species may be of various types, a new class of composition of matter is provided by the present invention. In their simplest form the compositions of the present invention comprise two sheets of graphitic carbon which contain: 1) at least one buckminsterfullerene species hosted in the interstices in between said sheets, and optionally 2) at least one of a first chemical species (also called the "first", or "hosted" chemical species) hosted in the interstices in between the graphite sheets. The compositions may contain intercalated in the interstices of said graphitic sheets mixtures of one or more buckminsterfullerene species alone or in combination with two or more first chemical species, or any combinations thereof. The first chemical species may comprise any atom, ion, molecule or other chemical element, compound, cluster, mixture or combination thereof in a form which is capable of existing in graphite interstices under normal conditions. The number of suitable first chemical species which are possible is therefore large. It is possible in some cases to, as a final step, remove the first chemical species from the interstices of the graphite framework, thus leaving a graphite framework which is intercalated only by one or more buckminsterfullerene species or combination thereof Several variations of the buckminsterfullerenes are known to exist, and this invention includes the use of the general class of variants of buckminsterfullerenes herein described as intercalatants in a graphite framework. One variation comprises a foreign chemical species such as a metal atom, a cluster of chemical species, or other molecular species entrapped within a buckminsterfullerene or within a Buckminsterfullerene-like cage such that escape of said entrapped species is not possible unless some of the carbon-carbon bonds of the buckminsterfullerene cage are broken. Such compositions of matter may be referred to in this specification as "fullerene-encapsulated species" (FES). I prefer to term the FES which comprises a lanthanum atom entrapped inside the C-60 buckminsterfullerene as:

"[$C_{60}FES\ La_1$]"

According to such nomenclature, the number and identity of the atoms which make up the buckminsterfullerene cage is first set forth per conventional means. This is followed by the letters FES, which indicate a fullerene encapsulation of the species which follows next, in this case, a lanthanum atom. The number of lanthanum or other atoms is also set forth per conventional means. The whole is conveniently closed within brackets, which will undoubtedly prove to be especially useful in future developments when dealing with charged ionic FES materials. This FES and one method for its production is described in the Journal of the American Chemical Society Volume 107, pages 7779-7780 (1985). Other large metal atoms such as potassium and uranium been similarly encapsulated by providing vapors of the metal which is to be encapsulated to the zone of carbon cluster annealing (the reaction zone where buckminsterfullerene cage formation occurs) during the formation of said buckminsterfullerenes.

Compositions of matter which comprise graphite having another (a "first") chemical species hosted in the interstices in between the graphite layers are known as "lamellar compounds of graphite", (abbreviated "LCOG"), and may be referred to as such in this specification.

Intercalation of graphite by a first chemical species occurs in stages. Generally speaking, it is possible to have a first chemical species intercalated in every successive layer of graphite, or in every second, third, or fourth layer. Graphite compounds which are intercalated to such degrees are termed first stage, second stage, third stage, and fourth stage intercalation compounds, respectively. The degree of intercalation by the buckminsterfullerenes in the compositions of this invention depend upon the degree of intercalation by the hosted chemical species in the LCOG raw material. A wealth of information concerning graphite intercalation compounds is set forth in the Journal entitled, "Advances in Physics", Volume 30, number 2, pages 139–326 (1981), and is incorporated herein by reference. For purposes of this invention, graphite which has one or more of the buckminsterfullerene species intercalated in the interstices of its stacked layers is itself also a LCOG, and as such is also a potential reactant for intercalation reactions by other chemical species. Buckminsterfullerenes species are chemical species.

DETAILED DESCRIPTION OF THE INVENTION

In one sense, the preparation of the compositions of the present invention may be regarded as a reaction between a buckminsterfullerene species and graphite in the presence of a "catalyst" which functions to widen the distance between the graphite sheets to allow for insertion of the buckminsterfullerene species. The catalyst (which has also previously been referred to as the first chemical species) also may act as a dopant to modify the physical properties of the final products when it is not removed from the final product. It is usually desirable for control of the stage of intercalation of the buckminsterfullerene species in the final products to first react graphite with the catalyst material so as to form a stable species having somewhat of a definite chemical composition (an LCOG). Such a compound is then used in a subsequent intercalation reaction with a buckminsterfullerene species. Some intercalation of graphite by a buckminsterfullerene species may occur when graphite is heated with the buckminsterfullerene species in the absence of a "catalyst", due to crystal defects normally present in graphite lattices. However, such intercalation is not preferable since it lacks control when compared to the processes of the instant invention, since it is not generally possible to control the crystal defects in a graphite lattice to the extent required in order to achieve the wide range of the degree of intercalation and consistent reproducibility provided by this invention. An example of a controlled reaction according to the instant invention is when the compound comprising nickelous chloride intercalated in a graphite framework to the point of Stage II intercalation is heated with a buckminsterfullerene species to form a stage II buckminsterfullerene species-intercalated graphite.

Since it is not an object of the present invention to provide methods of preparing LCOG's, an extensive treatment of this subject is not set forth herein. The information which is provided should assist in an understanding of the wide scope and versatility of the instant invention. State of the art methods of preparation of LCOG's are found in the chemical literature, and one source of such information is in the book edited by F. Levy entitled "Intercalated Layered Materials", which is incorporated herein by reference.

The term "buckminsterfullerene species" as used in this specification and the appended claims refers to a general class of matter which comprises spheroidally-shaped molecules, either neutral or electrically charged, which comprise a buckminsterfullerene or buckminsterfullerene-like cage, said cage in turn comprising carbon atoms as the majority of the atoms which make up the cage structure of said buckminsterfullerene or buckminsterfullerene-type cage, and which may optionally comprise an entrapped chemical species within the buckminsterfullerene cage, said entrapped chemical species not participating in any conventional chemical bonding with any of the atoms which comprise the cage structure itself, or other atoms optionally substituted for carbon as some of the atoms which make up the structure of the cage. "Chemical species" means atom(s), molecule(s), or clusters of atoms or molecules, or mixtures thereof, whether or not such species are neutral or electrically charged.

Although some of the buckminsterfullerene species-containing compositions of the present invention may comprise only carbon atoms in their buckminsterfullerene cage portion, buckminsterfullerene species are well-known wherein one or more other elements have been substituted for carbon atoms of the buckminsterfullerene cage (substituted buckminsterfullerenes). For example, $C_{59}B$ wherein a boron atom has taken the place of a carbon atom in the C-60 buckminsterfullerene. A molecule such as $C_{59}B$ is probably best termed a "heteronuclear buckminsterfullerene" since a foreign atom has been substituted for at least one of the carbon atoms which comprise the cage structure. This and other analogous molecules, the number of which is very great, which may comprise various other atomic species or combinations thereof substituted in place for one or more of the carbon atoms of a buckminsterfullerene-type cage properly belong to the family of "buckminsterfullerene species". It is not forseen that the mere substitution of one or even a few atoms of other chemical species, such as boron, as part of the cage structure of the buckminsterfullerenes significantly alters the reactivity of such a "substituted buckminsterfullerene" for purposes of the intercalation process taught herein and the present invention contemplates using such materials as reactants for intercalation into graphite interstices. It has also been found that the C-60 buckminsterfullerene undergoes complete hydrogenation to form $C_{60}H_{60}$, as well as partial hydrogenation to other compounds such as $C_{60}H_{36}$. The hydrogenation and ionization of C-60 buckminsterfullerene is described in the Journal of Physical Chemistry, Vol. 94, pages 8634–8636 (1990). Analogous fluorinations have been made. Both the partially or completely hydrogenated or fluorinated species are anticipated as being functional with respect to being intercalatable into graphitic interstices.

Homonuclear buckminsterfullerenes which are made up of only carbon atoms in the form of a closed-cage structure shall be referred to herein as, for example "the C-60 buckminsterfullerene" and "the C-70 buckminsterfullerene". The C-60 buckminsterfullerene is described in the NATURE article cited above (NATURE Vol. 318 page 162). Since such materials comprise only carbon atoms, they are properly referred to as allotropes or allotropic buckminsterfullerenes.

According to the terminology set forth above, the following materials are properly considered as "buckminsterfullerene species": 1) allotropic homonuclear buckminsterfullerenes which comprise only carbon atoms and which contain 60, 70, 84 carbon atoms, and other analogs; 2) ionized or hydrogenated heteronuclear or homonuclear buckminsterfullerenes; 3) fullerene encapsulated species whose buckminsterfullerene cage comprises only carbon atoms (homonuclear FES's); 4) fullerene encapsulated species whose buckminsterfullerene cage comprises atoms other than carbon as part of their cage structure (heteronuclear FES's); and 5) ionized, hydrogenated, or fluorinated heteronuclear or homonuclear FES's. An example of a heteronuclear FES comprises a lanthanum atom which is encapsulated by $C_{59}B$. That is, $[C_{59}B$ FES $La_1]$. Homonuclear FES's are exemplified by $[C_{60}FES\ La_1]$.

Preferably, an excess of the first chemical species is mixed with and caused to intercalate into graphite. Often, only a slight heating is required to begin the intercalation, as is the case with the alkalai metals, and some transition metal compounds. Potassium spontaneously forms intercalated graphite compounds wherein some of the potassium atoms of the stage 1 compound may be removed by heating in order to provide a second and third stage and other staged compounds. Ferric chloride is absorbed by graphite at about 190 C. Heating to 300 C. volatilizes the ferric chloride to give a stage 3 compound which at just over 400 degrees C. loses all of the ferric chloride and becomes pure graphite again. In this way it is seen that it is possible to remove the first chemical species by sufficient heating. This may not be a desirable effect in some cases, and the loss of the first chemical species by this mechanism must be borne in mind when selecting a first chemical species. Some of the hexafluorides of the noble metals may require reaction times as long as 4 to six weeks to achieve Stage I intercalation.

The rate at which intercalation of graphite by a given intercalatant occurs depends upon the nature of the intercalatant. As mentioned, potassium undergoes relatively rapid intercalation, the reaction to a stage I compound being accomplished in less than one hour, while similar degrees of intercalation by compounds such as hexafluorides of some transition metals such as rhenium may take as long as 500 hours. $ReF_6$ is a liquid with a melting point of about 18.5 degrees C, and this material in the liquid state is contacted with graphite and allowed to react until sufficient time as the intercalation reaction is as complete as is desired.

The rate of intercalation of a lamellar compound of graphite by a buckminsterfullerene species depends upon the layer spacing of the graphite sheets in the lamellar compound of graphite (LCOG). The layer spacing in turn is dependent upon the nature of the first chemical species which present in the interstices of the LCOG. Relatively rapid intercalations by buckminsterfullerene species may be achieved when the layer spacing is greater than the diameter of the buckminsterfullerene species.

I have calculated the diameter of the C-60 buckminsterfullerene to be 7.1 angstrom units. The nearest-neighbor distance between individual molecules of C-60 buckminsterfullerene in its hexagonal close packed unit cell is about 10 Angstroms. Therefore, the van der Waals diameter of C-60 buckminsterfullerene is about 2.9 Angstroms. In order for rapid intercalation it is preferable to provide a lamellar compound of graphite which has a layer spacing greater than about 9 or 10 Angstroms. Many of the transition metal halogen compounds or their ionic analogs serve this purpose well. Ionic analogs are mentioned and included since there may be some argument over the theory of the exact state of existence of a chemical species which is intercalated in graphite interstices is. For purposes of this invention, ionic analogs include all intercalated chemical species disclosed or implied for use in the present invention present in an LCOG to whatever extent charge transfer has taken place between the graphite and intercalatant.

The buckminsterfullerene species are caused to be inserted into the graphite interstices by mixing the selected buckminsterfullerene with the LCOG compound, until homogeneous, and then supplying sufficient energy to the mixture to cause the intercalation. This is preferably done in a furnace, using a crucible and a furnace in which it is possible to control the atmosphere in order to avoid oxidation reactions which can occur due to oxygen in the air, although the present invention contemplates the use of other forms of heat energy being useful such as microwave, infrared, ultraviolet, or other forms of electromagnetic radiation which are well-known as being able to transfer thermal energy to solid substances under ordinary conditions. The degree of heat required is generally not great, with a temperature in the range of about 50 degrees C to about 400 degrees C being preferred. For many LCOG compounds there exists a temperature, which is readily determied by one of ordinary skill in the art, at which the intercalatant species begin to be ejected from the graphite lattice. It is desirable to operate below this temperature. Another possible complication which may arise when using high temperatures is chemical reaction between the carbon atoms of the cage structure of the buckminsterfullerene species and the hosted chemical species of the LCOG. In this regard, it is desirable to use the minimum temperature necessary to cause intercalation of the buckminsterfullerene species into the LCOG while allowing for such intercalation to occur at a reasonable rate. In each case, these temperatures are readily determinable by one of ordinary skill in the chemical art.

The exact details of the mechanism of the intercalation of graphite layers by buckminsterfullerene species is not known.

Once intercalation by buckminsterfullerene species has been accomplished, it is possible to remove the first chemical species from the reaction product (using means which vary depending upon the first chemical species used), and further react the reaction product with other chemical species which otherwise would not have allowed insertion of the buckminsterfullerene species into the graphite interstices had they been employed as the first chemical species since the increase in the layer spacing of the graphite they would have imparted would have been insufficient for subsequent buckminsterfullerene insertion to occur. In this fashion it is possible to prepare intuitively unobvious compositions of matter.

For purposes of the present invention the functionality and requirements of the various possible intercalatant species are equivalent in the respect that they must cause sufficient widening of the interlayer distance in graphite in order that intercalation by a buckminsterfullerene species in subsequent reactions becomes physically possible. Since many intercalatant species function equivalently to widen the graphite layers sufficiently for insertion of a buckminsterfullerene species, it is with in the scope of the present invention to include any and all chemical species intercalatants which are suitable for this purpose as being part of the processes and compositions of matter taught herein. Lamellar compounds of graphite having more than one chemical species hosted inbetween the graphite interstices may also be employed for subsequent reactions of intercalation by buckminsterfullerene species.

The physical and chemical properties of compounds of graphite intercalated with buckminsterfullerene species and an optional dopant chemical species depend upon the dopant species and the nature of the buckminsterfullerene species which are hosted in the layers between the graphite interstices. By the processes disclosed herein, graphite which is intercalated by buckminsterfullerene species may be produced in which the ratio of the number of graphitic carbon atoms to buckminsterfullerenic carbon atoms is in the range of about 0.9:1 to 64:1.

The preferred embodiment of the present invention comprises first reacting graphite with a first (hostable) chemical species at an elevated temperature in an inert atmosphere such as argon so as to minimize side reactions. The first chemical species becomes intercalated between the sheets of the graphite as a result of the reaction, and during the intercalation, the distance between the graphite sheets increases significantly (preferably to at least about 7 or more Angstroms, depending on the first chemical species used). There is no preference of the use of any one particular first chemical species as far as the intercalation reaction between the buckminsterfullerene species and the lamellar compound of graphite is concerned. The main requirement is that the interlayer spacing between the graphite sheets is widened enough so that insertion of a buckminsterfullerene species in the subsequent insertion reaction step becomes physically possible. All chemical species which cause the interlayer distance of graphite to increase to greater than about 7 angstroms upon being intercalated into graphite interstices are generally useful for purposes of the present invention. Halogen compounds which contain more than one halogen atom per molecule of the compound generally cause the interlayer spacing of graphite to be sufficiently widened for purposes of buckminsterfullerene insertion reaction per this invention, and all chemical compounds which contain at least one halogen atom and which cause the interlayer spacing in graphite to be widened to a distance greater than about 8 angstroms upon being intercalated into pure graphite are herein indicated as having utility for purposes of insertion of buckminsterfullerenes into graphite according to this invention. This includes, but is not limited to the mono, di, tri-, tetra and pentahalides of the transition metal elements and the elements of groups III-A through VI-A (inclusively) of the periodic table. All that seems to be required is is that the graphite layers are widened sufficiently.

Inorganic acids which contain a nonmetal atom bonded to at least one oxygen atom including phosphoric, phosphorous, nitric, nitrous, perchloric, chloric, chlorous, hypochlorous, bromic, perbromic, sulfuric, sulfurous, periodic, iodic, iodous, hypoiodous, the oxyacids of selenium and tellurium, and polyanionic species which contain any of the non-metal atoms of these acids in a poly-configuration such as persulfate, orthophosphates, pyrophosphates, and any salts of these acids are all indicated as possible candidates as the hosted species provided they satisfy the stipulation that they widen the graphite sheets sufficiently for subsequent insertion of buckminsterfullerene species into the graphite framework when they are themselves caused to occupy an interstitial site in a graphite framework.

Chemical compounds of groups III-A through VI-A of the periodic table which contain oxygen or sulfur atoms as some of the atoms which are part of the molecular structure of the compound are herein indicated as being functional for causing widening of graphite layers sufficient for allowing subsequent insertion of a buckminsterfullerene species into a graphite framework, provided that the chosen compound causes the graphite layers to be widened greater than about 7 angstroms upon being intercalated into pure graphite.

It is possible to use mixtures of first chemical species to effect graphite layer widening also. The scope of the present invention therefore encompasses the use of a large number of first chemical species to widen graphite layer in the LCOG's they form sufficiently for insertion by a large number of possible buckminsterfullerene species. Preference is directed to the ease with which intercalation of a lamellar compound of graphite by a buckminsterfullerene occurs, to the resulting physical properties of the materials produced, and to the ease with which the hosted chemical species is subsequently removed from the graphite interstices as a final optional step.

I have identified several specific chemical species as being a suitable first chemical species. As previously mentioned, the larger that the first chemical species is, in terms of radius, the wider in general will be the separation of the graphite layers of the LCOG produced. The rate of intercalation by buckminsterfullerene species is dependent upon the layer separation, and is rapid when the interlayer graphite spacings are larger than the diameter of the buckminsterfullerene species. Below in table I is a showing of the approximate interlayer spacing imparted to graphite layers upon intercalation of just a few chemical species into graphite interstices to the degree of stage I intercalation:

TABLE I

| Chemical species | Interlayer Separation |
|---|---|
| No intercalatant (pure graphite) | 3.35 Angstroms |
| $FeCl_3$ | 9.4 Angstroms |
| $AlCl_3$ | 9.5 Angstroms |
| $SbF_5$ | 8.5 Angstroms |
| $SbCl_5$ | 9.4 Angstroms |
| Perchloric acid | 7.9 Angstroms |
| Chlorine heptoxide | 8.0 Angstroms |
| $AsF_5$ | 8.1 Angstroms |

When a specific halogen compound is suitable for causing sufficient widening of adjacent graphitic layers for insertion of a buckminsterfullerene species into the interstices, it is believed in general that an analogous halogen compound which contains a larger halogen species also functions in this regard. For example, aluminum trichloride is functional, and correspondingly so is aluminum tribromide. This is due to the larger size of bromide ion over the chloride ion. The same is generally true for pentabromide compounds of several of the elements such as group V (a) elements. The relative sizes of the halogen elements to one another have been known for quite some time and increase in the order: $I > Br > Cl > F$. In cases where the tri- or tetra- or pentahalide compounds are functional in widening the graphite interstices sufficiently for buckminsterfullerene insertion, analogous compounds containing larger halogens or mixed halogens are also generally functional in the same regard. Preferred first chemical species include large hexafluoride species of transition metals such as rhenium and platinum. This preference is due to the layer spacing imparted to the graphite, even through other first chemical species may intercalate more rapidly into the graphitic layers. Ferric and aluminum chlorides are also preferred because their intercalation reactions with graphite ares fairly rapid, and most of these chlorides may be removed from the final product at a later stage by treatment with hot aqueous HCl solution or acetone. Other soluble inorganic salts function as suitable hostable chemical species', even though it is true that their complete removal in an optional final step may not always be possible. The choice of means for removing the first chemical species depends upon the nature of the first chemical species. Solvents in which the first chemical species are soluble are generally useful in this regard, such as acetone or water for removing ferric chloride. Metallic elements may be conveniently removed by treatment with elemental mercury, or by heating sufficiently.

The second stage nickel chloride LCOG (which contains a periodic arrangement of one layer of $NiCl_2$ followed by two layers of graphite) is prepared by reacting a mixture of nickel chloride and graphite in a quartz tube furnace at 600 degrees C in an atmosphere of chlorine gas at a slightly reduced pressure of 600 torr. I heated a sample of this LCOG with the C-60 buckminsterfullerene at 200 degrees C under an argon atmosphere. Such treatment caused intercalation of the buckminsterfullerene species into the spaces inbetween the layers of the LCOG. The resulting product had both Nickel Chloride and the C-60 buckminsterfullerene intercalated in the interstices of the graphite layers.

The chemical and physical properties of the compositions of matter of the present invention are strongly dependent upon the ratio of the number of buckminsterfullerene species molecules actually intercalated in the graphite to the number of sites available for intercalation by the same in the graphite interstices. It is believed that the best lubricating properties occur when this ratio is about 2:7 or larger. The term "buckminsterfullerenic carbon atom" means a carbon atom which is part of a buckminsterfullerene cage structure. The term "graphitic carbon atom" means a carbon atom which is a member of a planar hexagonal network of a graphite layer. The amount of buckminsterfullerene species intercalated into an LCOG is controlled by controlling the amount of buckminsterfullerene species which is reacted with the LCOG during its intercalation.

The graphite employed as the starting material may be of any particle size or grind, and the time required for complete intercalation of the buckminsterfullerene species is dependent upon the nature of the graphite particles, and any impurities present. The graphite raw materials may be degassed by heating under vacuum for time sufficient to remove gaseous impurities if desired. Intercalation of buckminsterfullerene species has been effected into different graphites, and the choice of the graphite ultimately depends upon the intended application. Graphites with small particle sizes are intercalated rapidly. The intercalation process of the instant invention and the number of possible products is very great.

As an alternative procedure, a buckminsterfullerene species, graphite, and the first chemical species may all be reacted together at the same time in order to prepare compositions of the present invention.

The following instances are provided exemplary of the invention and should not be considered delimitive thereof in any way. Other analogous compositions may be produced using similar processes, and the intercalated final products are effected principally by the relative amounts of buckminsterfullerene to lamellar compound of graphite intermediate and the stage of intercalation of the lamellar compound of graphite intermediate. Consideration must be given to the fact that while this invention has been described and disclosed in relation to certain preferred embodiments, obvious equivalent modifications and alterations thereof will become apparent to one of ordinary skill in the chemical art upon reading and understanding the specification contained herein. Accordingly, the presently disclosed invention is intended to cover all such modifications and alterations, and is limited only by the scope of the claims which follow the examples provided.

EXAMPLE I 5.0 grams of Dixon 620 powdered amorphous graphite and 5.0 grams of ferric chloride were ground together in a mortar and then placed into a quartz combustion boat. The combustion boat and its contents were heated to 190 degrees C. for ½ hour in a quartz tube furnace under an argon atmosphere. After the ferric chloride was taken up into the graphite to form an approximately stage I LCOG, the contents of the combustion boat were placed back into the mortar and 2 grams of purified C-60 buckminsterfullerene in the form of a microcrystalline powder was added to the mortar and lightly mixed to form as homogeneous a mixture as possible without undue grinding. The contents of the mortar were then placed back into the combustion boat and heated to 140 C. in the tube furnace under a stream of argon for one hour. The product of this reaction was extracted with acetone in order to remove the extranneous ferric chloride which was only superficially bonded to the graphite framework. The resulting solid which was filtered off was treated with benzene in order to remove small amounts of superficial C-60. The product contains both C-60 and ferric chloride hosted in the interstices of a graphite framework.

EXAMPLE II

The reaction product of example I was heated to 420 degrees centigrade until all of the ferric chloride was expelled. The resulting product was graphite which was intercalated by the C-60 buckminsterfullerene.

EXAMPLE III 5 grams of the second stage lamellar compound of graphite with aluminum trichloride was mixed with 0.40 grams of a mixture of the C-60 and C-70 buckminsterfullerenes and heated to 120 degrees C. in a stream of argon for ½ hour. The resulting product had aluminum chloride and the buckminsterfullerenes intercalated in graphite.

I claim:

1. A composition of matter comprising graphite which is structurally defined as comprising planar stacked layers of sp-2 hybridized hexagonal networks of carbon atoms wherein said graphite is intercalated with one or more buckminsterfullerene species in the interstices between said stacked layers and the ratio of graphitic carbon atoms to buckminsterfullerenic carbon atoms is in the range of about 0.9:1 to 64:1.

2. A composition of matter as set forth in claim 1 wherein said buckminsterfullerene species comprises a heteronuclear buckminsterfullerene.

3. A composition of matter as set forth in claim 1 wherein said buckminsterfullerene species comprises a homonuclear fullerene encapsulated species.

4. A composition of matter as set forth in claim 1 wherein said buckminsterfullerene species comprises a heteronuclear fullerene encapsulated species.

5. A composition of matter as set forth in claim 1 wherein said buckminsterfullerene species comprises the 60 carbon atom allotropic buckminsterfullerene.

6. A composition of matter as set forth in claim 1 wherein said buckminsterfullerene species comprises the 70 carbon atom allotropic buckminsterfullerene.

7. A composition of matter as set forth in claim 1 wherein said buckminsterfullerene species comprises at least one hydrogen or fluorine atoms chemically bonded to atoms of the cage structure of said buckminsterfullerene species.

8. A composition of matter according to claim 1 additionally comprising a hosted chemical species in the interstices between said stacked layers of graphite.

9. A composition of matter as set forth in claim 8 wherein said hosted chemical species comprises at least one chemical element or chemical compound which causes the separation distance between adjacent graphitic sheets to be maintained at a distance of at least about 5 angstroms upon being intercalated into pure graphite.

10. A composition of matter as set forth in claim 8 wherein the separation distance between adjacent layers of planar hexagonal carbon atom networks is at least about 8 Angstroms.

11. A composition of matter as set forth in claim 1 wherein said buckminsterfullerene comprises a buckminsterfullerene species which has an alkalai metal atom trapped within its cage structure.

12. A composition as set forth in claim 8 wherein said hosted chemical species comprises a chemical compound which includes an element selected from the group consisting of: fluorine, chlorine, bromine, or iodine.

13. A composition as set forth in claim 8 wherein said hosted chemical species comprises a chemical compound which includes an element selected from the group consisting of: nitrogen, phosphorous, arsenic, antimony, and bismuth.

14. A composition as set forth in claim 8 wherein said hosted chemical species comprises a chemical compound which includes an element selected from the group consisting of: oxygen, sulfur, selenium, and tellurium.

15. A composition as set forth in claim 8 wherein said hosted chemical species comprises water.

16. A composition as set forth in claim 8 wherein said hosted chemical species comprises a chemical element or compound which causes the interlayer spacing of graphite to increase to greater than about 8 angstroms upon its being intercalated into pure graphite.

17. A method for forming a synthetic carbon-containing composition comprising the step of reacting a lamellar compound of graphite which is structurally defined as comprising stacked layers of planar sp-2 hybridized hexagonal networks of carbon atoms, said stacked layers having a hosted chemical species intercalated in the interstices between said stacked layers, with a buckminsterfullerene species at a sufficient temperature and for sufficient time to cause intercalation of said stacked layers by said buckminsterfullerene species.

18. A method as set forth in claim 17 wherein said hosted chemical species of said lamellar compound of graphite comprises a chemical element, chemical compound, or a mixture thereof, which causes the distance between adjacent graphitic layers to be maintained at a distance sufficient for subsequent intercalation of the graphite interstices by a buckminsterfullerene species.

19. A method as set forth in claim 17 wherein said hosted chemical species of said lamellar compound of graphite comprises a chemical element, chemical compound, or a mixture thereof, which causes the distance between at least one set of adjacent layers of planar sp-2 hybridized hexagonal networks of carbon atoms of the lamellar compound of graphite reactant to be greater than about 6 angstroms.

20. A method as set forth in claim 17 wherein the distance between at least one set of adjacent layers of planar sp-2 hybridized hexagonal networks of carbon atoms of the lamellar compound of graphite reactant is at least about 7 angstroms.

* * * * *